Sept. 26, 1950 W. S. HALSTEAD 2,523,295

AIRWAY NAVIGATIONAL SYSTEM

Filed June 7, 1945 8 Sheets-Sheet 1

WILLIAM S. HALSTEAD
INVENTOR

By [signature]

ATTORNEY

AIRWAY NAVIGATIONAL SYSTEM

Filed June 7, 1945 8 Sheets-Sheet 2

WILLIAM S. HALSTEAD
INVENTOR
By Herbert H. Smith
ATTORNEY

Sept. 26, 1950 W. S. HALSTEAD 2,523,295

AIRWAY NAVIGATIONAL SYSTEM

Filed June 7, 1945 8 Sheets-Sheet 3

WILLIAM S. HALSTEAD
INVENTOR

By [signature]

ATTORNEY

AIRWAY NAVIGATIONAL SYSTEM

Filed June 7, 1945

8 Sheets-Sheet 4

WILLIAM S. HALSTEAD
INVENTOR

By [signature]

ATTORNEY

WILLIAM S. HALSTEAD
INVENTOR

ATTORNEY

Sept. 26, 1950 W. S. HALSTEAD 2,523,295

AIRWAY NAVIGATIONAL SYSTEM

Filed June 7, 1945 8 Sheets-Sheet 6

WILLIAM S. HALSTEAD
INVENTOR

ATTORNEY

Sept. 26, 1950 W. S. HALSTEAD 2,523,295

AIRWAY NAVIGATIONAL SYSTEM

Filed June 7, 1945 8 Sheets-Sheet 7

WILLIAM S. HALSTEAD
INVENTOR

By [signature]

ATTORNEY

WILLIAM S. HALSTEAD
INVENTOR
By [signature]
ATTORNEY

Patented Sept. 26, 1950 2,523,295

UNITED STATES PATENT OFFICE 2,523,295

AIRWAYS NAVIGATIONAL SYSTEM

William S. Halstead, Purchase, N. Y., assignor, by mesne assignments, to Farnsworth Research Corporation, a corporation of Indiana Application June 7, 1945, Serial No. 598,051

15 Claims. (Cl. 343—101)

This invention relates in general to radio communicating systems and is more particularly concerned with an automatic communications system for effecting recurrent transmission of aural and/or visual intelligence within substantially localized communicating zones in the vicinity of designated transmitting points along traffic routes, one example being at municipal airports along air routes.

The particular embodiment of the invention as described herein is applicable in the field of air navigation and provides means whereby the pilot of an aircraft in flight is enabled to continuously receive automatic radiotelephone or other signals such as those from a facsimile or television scanner, teleprinter or telautograph and useful in conveying specific information such as the position of nearby airports, local flight data, wind velocity, local airport landing instructions, "radio paging" queries, and other information of value to operators or occupants of aircraft flying in the vicinity of the local transmitting point at which the automatic radiotelephone is located.

However, this application of the invention is illustrative only, for the system may be employed to advantage in other fields, such as those of marine, railway, and highway transportation.

Under present flying procedure, the average civilian pilot when flying by contact often has to rely primarily upon known landmarks, or other visual aids such as large painted or other visual signs on rooftops or highways to ascertain his location. Since he may be moving so rapidly as not to obtain readily the desired information, or weather conditions may be such as to seriously interfere with the effectiveness of such signs, they may not be of any use when the pilot urgently needs them. Also, in the winter months particularly, these markers may be covered with snow or otherwise rendered ineffective, and therefore are of no value in guiding him to his destination.

The present invention, with these problems in view, resides in the installation in each municipality, at each airport or other selected location or locations of automatic radiotelephone transmitting apparatus which provides continuously-operable, automatically repetitive, guiding voice and tone signals, with an associated visual marker, to serve as a local flying aid for pilots of aircraft within range of the transmitting apparatus. If a pilot wishes to go to a particular nearby airport, the automatic radio-telephone transmitter as a convenient, and always available, homing point which continuously gives its exact location, as well as its identity, together with all pertinent landing information to enable the pilot to make a safe landing. Facsimile or other graphic signal transmitting and receiving equipment may also be used with the system to provide a visual record or image of map details pertinent to the locality of the transmitting point in the vicinity of which the aircraft is flying. By the term "graphic signal" is meant an electrical signal produced by a facsimile or television scanner, a teleprinter transmitter such as a Teletype machine, or a telautograph or other device employed in transmission of printed records, maps, photographs, or other visually-discernible material. By "graphic signal transducer" is meant any device that converts graphic or visible matter or intelligence into a corresponding, or equivalent, electrical signal. A facsimile or television scanning device, a teleprinter transmitter, or telautograph machine would be examples of graphic signal transducers.

If triangulation methods are used, as in bad weather, or for precision flying, the pilot of the aircraft in flight after reception of radio signals from such an apparatus, may receive a second signal from another automatic transmitter in the general locality and within a few seconds determine its location, after which, by simple triangulation procedure, he may establish his approximate position with respect to the two transmitters, the entire operation being effected in a minute or less by relatively simple means adaptable for use by the average civilian pilot.

In addition to the features outlined. each automatic transmitter is provided with visual coded identifying signals properly placed with respect to the location of the nearest field as observable from the air, said visual signals being illuminated synchronously with respect to the emission of an identifying coded signal from said transmitter, whereby the pilot of the aircraft, when in sight of the visual signal has a positive check, by both visual and audible means, as to the identification of the station and the location of the nearest airport with respect to the transmitter.

The emanating means at each transmitter consists essentially of (1) a low-power radio telephone transmitter employing either a standard low frequency or a V. H. F. channel as assigned to aviation services, (2) a remotely-controlled aural or visual signal recording and reproducing device, preferably such as that of the magnetic recorder-reproducer type, in which a steel tape or wire wound as a closed-loop, with suitable magnetic response characteristics, is employed as a signal storage means, this being connected to continuously modulate the transmitter so that the recorded signals, such as voice or facsimile information with regard to transmitting location or field identification, direction of wind, wind velocity, barometric corrections, and other pertinent information, is continuously transmitted in a repetitive manner, and (3), where desired, a horizontally-disposed neon arrow of suitable dimensions, and/or other suitable visual marker, observable from the air, which may be illuminated in synchronism with the emission of a corresponding radio tone signal from the transmitter with which the operation of the visual marker is coordinated.

These transmissions may be utilized on aircraft by means of radio receivers selectively tunable to said transmitters. If a radio direction finder is associated with the receiver, a triangulating apparatus may be used in connection with the system of this invention, so that the pilot may quickly and accurately determine the position of his aircraft with relation to the automatic ground transmitter or transmitters, and thus permit the pilot to set a direct course for a selected airfield.

One object of the present invention is the provision of a plurality of automatic, continuously repetitive, voice-modulated and coded identifying radio signal sources, these sources being instantly available to the pilots of aircraft while in flight in the vicinity of said signal sources so that the pilot thereof will continuously have available, in plain voice signals, instructive information that can be relied upon to guide him to his selected airfield, to select a given runway, to land safely thereon, or to convey other information of value to occupants of an aircraft.

Another object of the present invention in addition to that stated above, is to provide a guiding system incorporating a plurality of local zone transmitters of automatic type and a central control unit whereby the information conveyed by the zone transmitters may be instantly changed from a central point and monitored thereafter.

Another object of the invention is to provide means whereby combined audible and visual indications of exact location and identity of an airport or airways transmitter serving a localized communications zone extending for a relatively short distance about the transmitter is automatically provided for occupants of aircraft upon entry of the aircraft within the localized communications zone served by the transmitter.

Still another object of the invention is to provide means whereby graphic record material such as map details, printed records of local airport or airways traffic control instructions and names of communities over which an aircraft may be flying are automatically reproduced in graphic record form within the aircraft when it enters a localized airway control zone or airport communications zone.

Still another object of the invention is to provide in addition to the automatic radio telephone transmission, a visual coded directive signal operably associated therewith so that the pilot in approaching the transmitter under conditions of visibility will be instantly given the directional line to the field, and, by synchronized operation of the directive signal, it may immediately be identified as that coordinated with a particular transmitter and its associated airport or local identification point.

Still another object of the invention is the provision of means whereby the pilot is enabled to quickly select a given automatic radiotelephone transmitter through use of a simplified triangulation technique in which a small selected zone map, pertaining to the limited area over which he is flying, is employed to aid in establishing his position.

In order that the invention may be fully understood and its many advantages fully appreciated, attention is invited to the accompanying drawings, in which.

Figure 1:
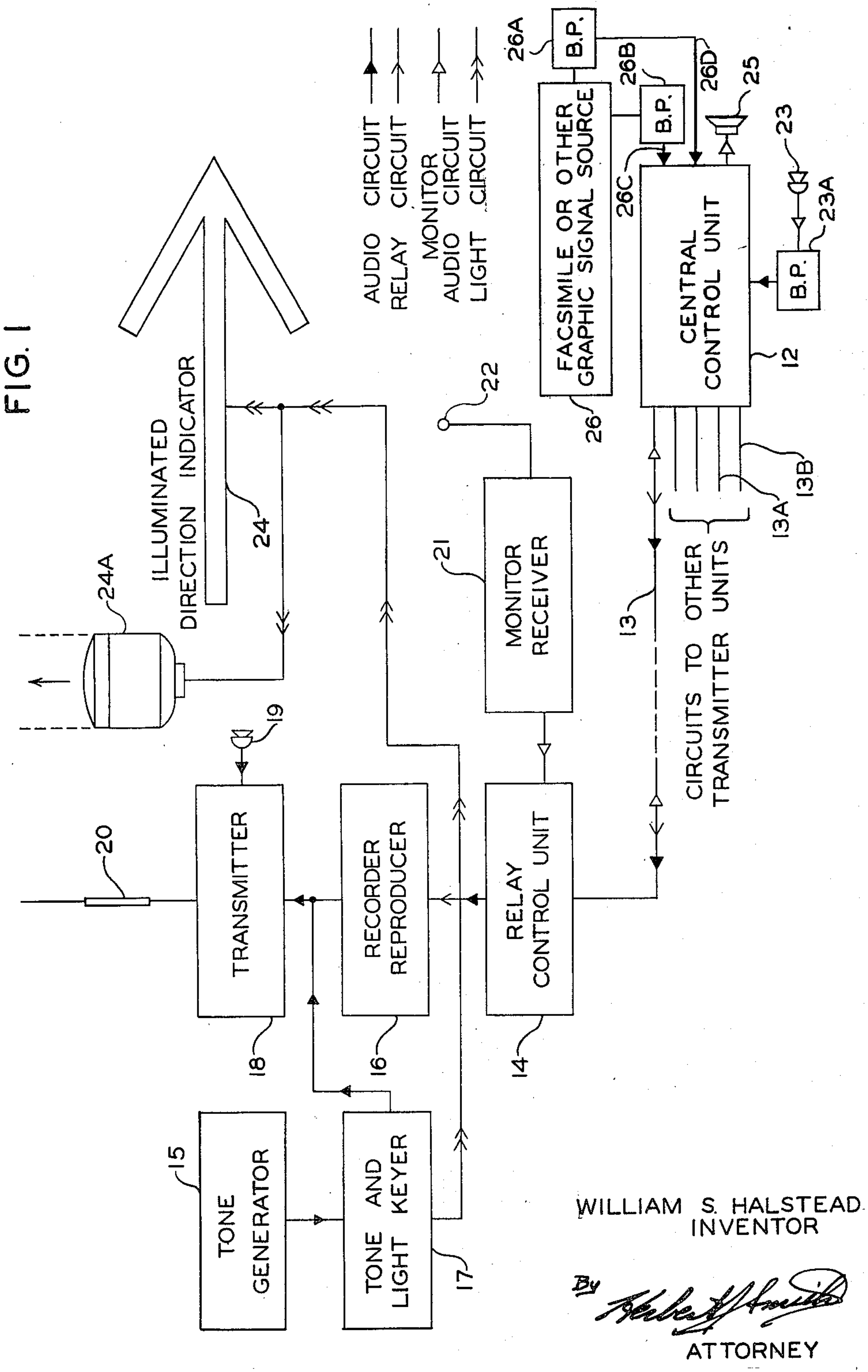
Fig. 1 is a block diagram of a central control unit and a remotely controlled transmitter and direction indicator combination.

Referring to Fig. 1, numeral 12 indicates a central control unit which may normally be located at an airport or a central control point where complete Government weather reports and facilities are available.

The central control unit as illustrated employs a microphone 23 and a loudspeaker 25 for voice transmission and reproduction, respectively, as will be explained in detail in subsequent paragraphs. A band-pass filter 23a may be inserted as shown between the microphone and control unit 12 to pass effectively only voice frequencies extending between approximately 200 cycles and 3,000 cycles.

A facsimile scanner 26 or other graphic signal transmitting device such as a television scanner or teleprinter of conventional type (not illustrated) may also be connected with an input circuit 26D of the control unit 12. A band-pass filter 26A is inserted between the output circuit of the facsimile scanner 26 and input circuit 26D of the control unit 12 to effectively pass graphic signal frequencies within a selected range, such as 3,000 cycles to 5,000 cycles, which are utilized as marking or printing signals in order to prevent objectionable interference with voice signals if both graphic and voice signals are transmitted concurrently. A second band-pass filter 26B, inserted between an output circuit 26C of the scanner 26 and an input circuit 26C of control unit 12 is used to effectively pass only those frequencies used for motor control and synchronizing purposes at receiving points. For purposes of illustration, these frequencies may lie in the band extending from 100 cycles to 200 cycles or in the band from 6,000 cycles to 7,000 cycles so as not to produce objectionable interference with voice signals if the latter are transmitted concurrently with the graphic signals.

The central control unit 12 is connected to a remote zone radio transmitter installation, such as transmitter 18 and associated equipment by means of a telephone line 13, as will be described hereinafter. The remote control unit 12 may also be connected to other zone transmitter installations by means of telephone lines such as 13*a* and 13*b*. These zone installations can be located at or near airports or landing strips in the area under the control of the central control unit.

Each zone transmitter installation as illustrated consists of a selectively-actuated control unit such as a remotely-controlled relay control, or selective switching unit 14, a recorder-reproducer unit 16, preferably of magnetic record type, coupled to the input circuit of radio transmitter 18, which connects to an antenna 20. The zone transmitter installation also may include tone generator 15, to which is connected a combination tone and light keyer 17 for the purpose of effecting radio transmission of a coded identifying tone signal in synchronization with the flashing of an illuminated direction indicator 24, such as a neon arrow or other suitable marker pointing in the direction of the nearest airport or landing strip, and/or a vertical light-beam device, such as upwardly-directed search light 24A. Also included in the illustrative zone installation is a monitor receiver 21 with an associated pickup antenna or coil 22. The microphone 19 is provided for local control or testing purposes. The output of the transmitter 18 is sufficient to have an effective range of approximately 10 to 20 miles in normal operation, although greater or less range may be provided where desirable by increasing or decreasing the power output of the station. The recorder-reproducer 16 is preferably of the magnetic tape or wire type which automatically reproduces its recorded message in a repetitive manner.

Figures 2, 3, 4, 5:
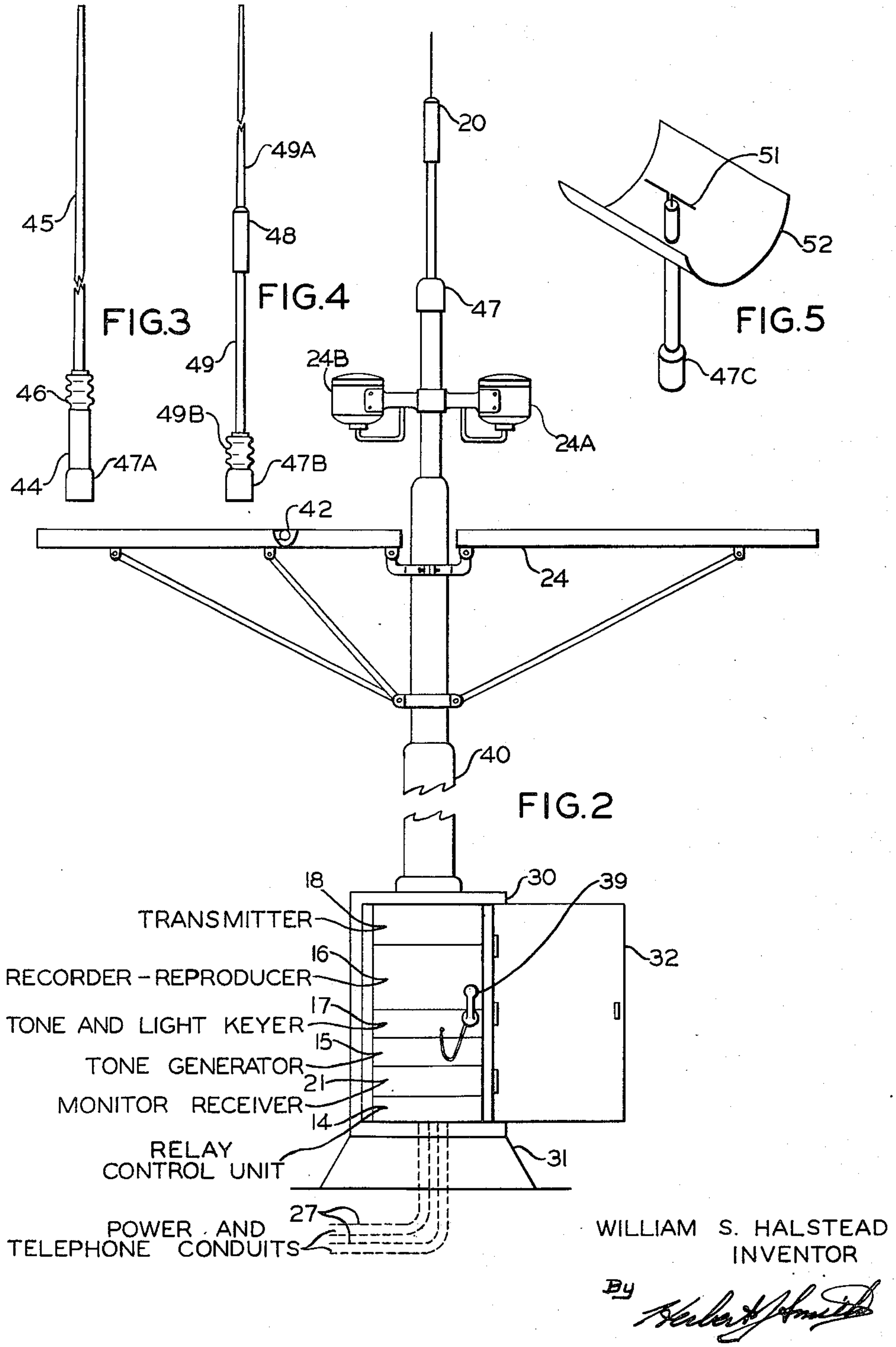
Fig. 2 shows a combination transmitter and indicator equipment employed in an illustrative application of the invention.
Fig. 3 is an optional form of antenna for use with a transmitter equipment showing a low or medium frequency type of vertical radiator.
Fig. 4 is another optional form of antenna for use with the equipment of Fig. 2, incorporating a low-frequency or medium-frequency type of radiator employing center loading.
Fig. 5 is another antenna arrangement for use with the equipment of Fig. 2 embracing a high frequency type of radiator with a reflector for production of an upwardly-directed radiation pattern or vertical beam.

Fig. 2 illustrates one form of zone radio transmitter installation in combination with visual markers and consists of a weatherproof steel case 30 erected on a concrete base 31. Electric power and telephone conduits 27 are run underground from the nearest service connection to the transmitter. A weatherproof hinged door 32 allows access to the interior of the steel case 30 in which are mounted in rack arrangement a relay control, or selective switching unit 14, a monitor receiver 21, a tone generator 15, a tone and light keyer 17, a recorder-reproducer 16, transmitter 18, and a telephone handset 39. A steel-pipe mast 40 may be mounted on the top of the steel case 30 as shown. The illuminated directional arrow structure 24 is erected at a suitable elevated point on the mast and in the representative illustration is preferably made in the form of a rigid aluminum alloy or stainless-steel trough, properly braced, as is more fully shown in Fig. 6, which serves as an upwardly-directed reflector for the neon light or other suitable gaseous discharge tubes 42. The arrow may be arranged so that it will point in the direction of the nearest airport or landing strip, with the electrical circuits of the lights such that they will emit a visible coded identifying signal in synchronization with the emission of a tone signal from the radio transmitter. In addition to the arrow marker 24, in which neon lights 42 are employed, upwardly-directed search lights 24A and 24B, which are provided in duplicate in the illustrative design, may be used to produce a vertical shaft of light, automatically flashing in synchronization with the emission of tone signals from the transmitter to serve as a navigational aid at night. The synchronized operation of the tone signal and visual signals thus acts as a combined aural and visual guiding means to a pilot in an airplane and provides a check on his location when approaching a transmitter. A coaxial antenna 20, or other suitable radiator, is mounted on the top of the steel pipe mast 40. Other forms of antenna may be employed depending upon the frequency employed and the desired radiation characteristics. For this purpose, a detachable threaded top cap 47 allows the use of any desirable type of antenna, such as a loaded vertical radiator 45, Fig. 3, a top-loaded or center-loaded antenna 49—49A, Fig. 4, or V. H. F. antenna 51 with upwardly-directed reflector 52, Fig. 5. In each case, the caps 47A, Fig. 3; 47B, Fig. 4; or 47C, Fig. 5; are similar to cap 47, Fig. 2, and exchangeable therewith, depending upon the frequency range of the associated transmitting equipment and desired radiation pattern.

Fig. 3 shows the general details of the antenna designed for low-frequency or medium-frequency operation, including an enclosed base loading coil 44 and insulator 46, and a tapered steel mast 45 extending from 15 to 30 feet above the insulator 46. The antenna may be mounted on mast 40, Fig. 2, by means of threaded cap 47A.

Fig. 4 illustrates the general details of another illustrative type of antenna designed for low-frequency or medium-frequency operation, with the loading coil 48 placed at an intermediate position on the vertical antenna 49—49A as a means of obtaining improved results at certain frequencies. The antenna is supported by insulator 49B. Threaded cap 47B is employed in mounting the antenna on mast 40, Fig. 2.

Fig. 5 shows general details of high frequency antenna 51, with upwardly-directed reflector 52, which may be desirable to use in certain instances in connection with a very high frequency or microwave transmitter installation, particularly in the event that a vertically-directed radiation pattern or vertical beam is required. Threaded cap 47C is used in mounting the antenna at the top of mast 40, Fig. 2.

Figure 6:
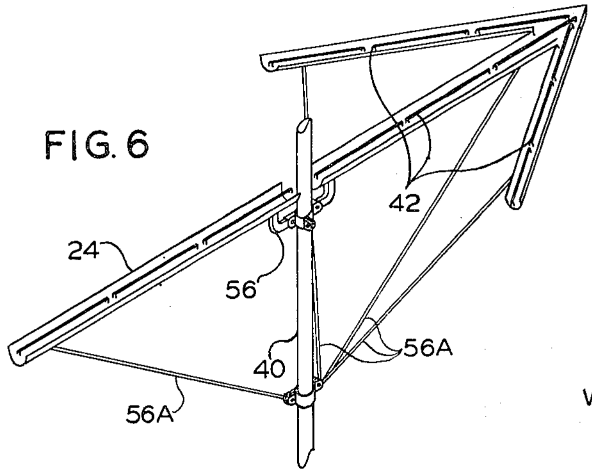
Fig. 6 is an illuminated directional indicator showing construction details.

Fig. 6 is another view of the illuminated arrow-marker shown in side elevation by 24 of Fig. 2. The arrow marker 24 in the illustrative design, is made in the form of a rigid aluminum alloy or stainless-steel trough in which are supported the neon tubes 42 or other suitable sources of illumination. The neon tubes may be in the form of standard units that can be connected to suitable receptacles to provide easy replacement. The arrow is rigidly supported on mast 40 by the brackets 56 and braces 56A.

The installation as illustrated may also be erected on a tall building, water tower, or any structure located in the clear and above surrounding trees or obstructions.

Figure 7:
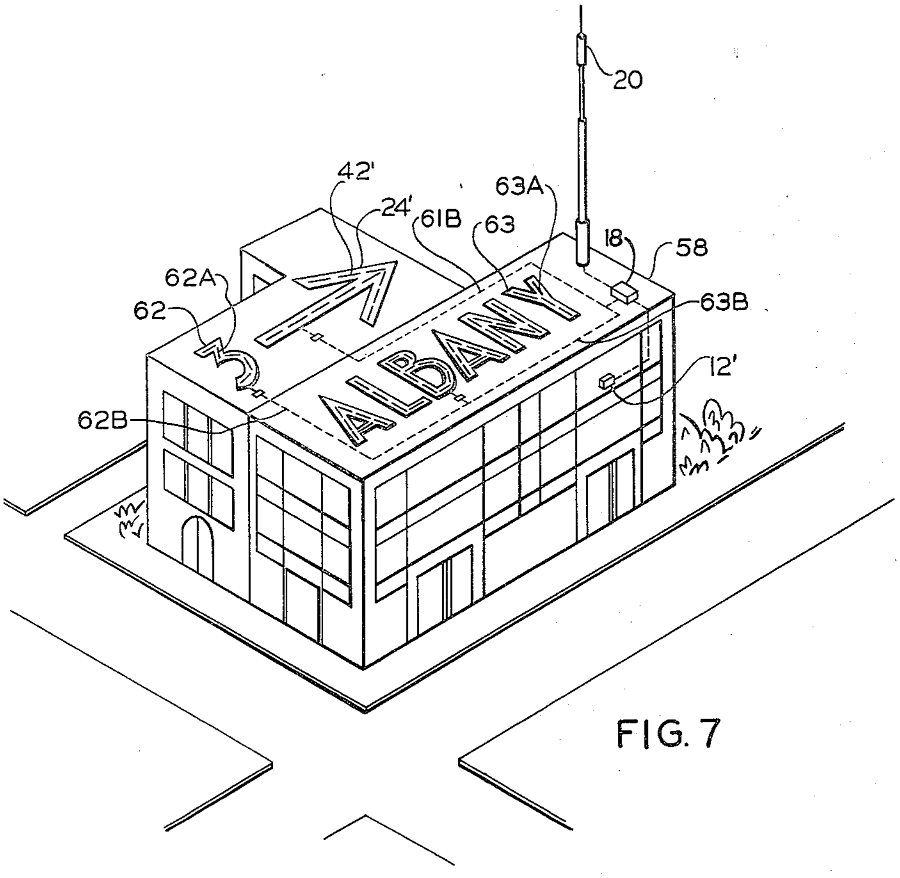
Fig. 7 is an illustrative transmitter and illuminated indicator combination of different form from that shown in Fig. 2 and erected on a building or other structure.

Fig. 7 shows an optional system that may be erected on the roof of a building 58 with a control unit 12′ located inside the building. The transmitter antenna 20 and illuminated markers 61, 62, and 63 are erected at a convenient point on the roof of the building. The illuminated markers may consist of an illuminated or luminous directional arrow 24′ with neon tubes 42′, similar to that described previously, operating in conjunction with a large indicating numeral 62, employing neon tubes 62A, which together indicate the direction and number of miles to the nearest airport or landing strip.

An illuminated or luminous sign 63, with neon tubes 63A, bearing the name of the airport or town may also be coordinated electrically by means of electric power circuits 61B, 62B, and 63B, with the illuminated arrow 24′ and mileage numeral 62 so that the neon lights 42′, 62A, and 63A in all markers or signs will be keyed simultaneous with the coded signal from the transmitter.

Figure 8:
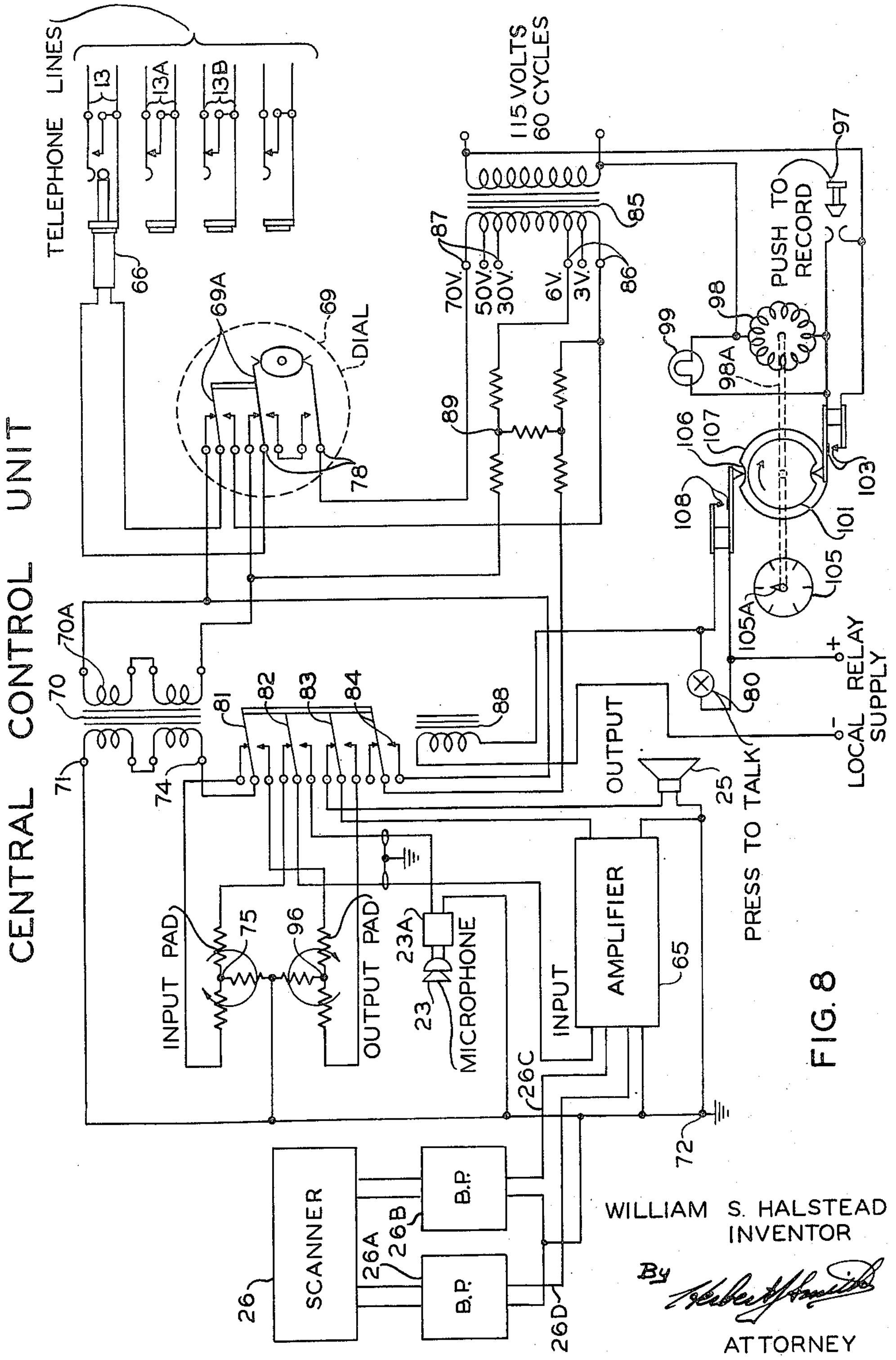
Fig. 8 is an illustrative remote control circuit used at a central control point.

Fig. 8 is a schematic diagram of one form of remote control circuit used at a central control point which is provided with multiple telephone lines connecting to a group of automatic zone transmitting units such as shown in Fig. 2 and includes means for selectively connecting to a desired zone transmitter or to all zone transmitters simultaneously, as desired.

In Fig. 8, the amplifier 65 is a dual purpose type, used both for line-to-speaker reception of signals from the remote monitor receiver such as 21, Fig. 2, and for microphone-to-line operation for outgoing transmissions through a zone transmitter such as 18, Fig. 2. A facsimile scanner 26 or other graphic record transmitter also connects with an input circuit of the amplifier 65 during such periods as it may be desirable to transmit graphic record copy such as weather maps.

The illustrative circuit of Fig. 8 is shown in the receive or monitor position with the phone plug 66 providing circuit connection and switching means between a selected telephone line such as 13, extending from the control point to a remote zone transmitter point as shown in Figs. 1 and 2. A conventional telephone dialing mechanism 69, having line transfer contacts 69A, which connect with winding 70A of the line transformer 70, is utilized in the illustrative equipment. The terminal 71 of the line transformer 70 connects to ground terminal 72, which is also common to one side of the output and input circuits of amplifier 65, and the loudspeaker 25. The terminal 74 of line transformer 70 normally connects through the contact 81 of relay 88 (in the "receive" position) to the input T-pad 75 and thence through the contact 82 of relay 88 to the input circuit of amplifier 65. At the same time, the output circuit of amplifier 65 connects through the contact 83 on relay 88 to the loudspeaker 25, thereby completing the circuit so that incoming signals from line 13 may be reproduced by the loudspeaker 25 at a level as determined by the adjustment of the input pad 75.

A power transformer 85, having taps connecting with low-voltage terminals 86 supplies an alternating-current E. M. F. of the order of 3–6 volts, which is employed as non-pulsing relay control voltage in the remote control circuits of the associated zone transmitting and receiving equipment of Figs. 1 and 2 as will be explained hereinafter. H-pad 89, connected across 6-volt terminals 86, is provided as a voltage-injection network, being adjusted to match the impedance of the telephone line and to inject the desired non-pulsing relay control voltage on line 13 at an optimum level, such as minus 4 db. This relay control voltage is applied across telephone line 13 through closure of contacts 84 of relay 88 when the relay is energized during transmitting periods. The transformer 85 is also provided with taps at 30, 50, and 70 volts to supply a relatively high-voltage dialing current for use in actuating a selective switching or pulse actuated stepping relay circuit of any well-known type at the transmitting point, as will be described in subsequent paragraphs. In order to effect application of dialing voltage on line 13, dial "pulsing" contacts 78 of dialing mechanism 69 are connected in series with the source of dialing voltage derived from tap 87 of transformer 85 and thereby impress a dialing voltage across the telephone line when the dial is rotated in the well-known dialing operation.

A microphone 23 is connected through band-pass filter 23A as shown in Fig. 8, one conductor then going to the common ground terminal 72, the other conductor from the microphone circuit being connected to movable contact 82 of relay 88 when this relay is energized during speech transmitting periods, thereby applying speech voltage to the input of amplifier 65. A "T" pad 96 is connected to relay 88 as shown, the output side of the "T" pad being connected to line transformer terminal 74 when contact arm 81 is moved downwards to its associated lower contact as relay 88 is energized, the input side of the "T" pad being connected to the high side of the output circuit of amplifier 65 through relay contact arm 83 when it is moved downward to its associated lower contact as the relay 88 is energized.

A "press-to-talk" switch 80, which may be incorporated on the control panel of the remote control unit, or in a handset not illustrated, is used to apply energizing voltage to relay 88 during direct speech transmitting periods, this switch being placed in series connection with a source of E. M. F., identified as "local relay supply" in the drawing of Fig. 8.

In order to provide an automatic timing and control means for the remote recorder-reproducer 16, Fig. 2, a recorder timing or cycling motor 98, having a suitable gear-reduction driven shaft 98A is used to provide a complete rotation of control cams 101 and 107 within a predetermined recording period, or cycle. In the illustrative equipment herein described, the recording period, or cycle, is designated as a one-minute period, this being the operating period or cycle during which the remote recorder-reproducer mechanism 174, Fig. 10, effects a complete recording or reproducing cycle, as will be hereinafter described.

A momentary-contact switch 97, Fig. 8, is used to place the timing motor 98 in initial operation.

Contacts 103 which are closed by cam 101 as it rotates are arranged in parallel across the contacts of "push-to-record" switch 97, thereby shunting the switch 97 contacts after initiation of rotation of cam 101 and automatically keeping the motor in operation until the cam 101 has completed its cycle of rotation. It is pointed out that the time required for cam 101 to complete a full cycle of rotation is substantially equivalent to the duration of the predetermined one-minute recording cycle of remote recorder-reproducer 174, Fig. 10.

Contacts 108, Fig. 8, actuated by cam 107, serve to apply control voltage to relay 88, thereby placing the circuits in the "transmit" position, upon initiation of movement of motor 98, these contacts being maintained in closed recording cycle. The contacts 108 are opened, however, slightly before the completion of the recording cycle of remote recorder-reproducer 174, Fig. 10, by means of the depression 106 in cam 107, which is so arranged that it permits contacts 108 to open just prior to completion of the recording cycle of remote recorder unit 174, thereby running voltage from control relay 88.

Recording pilot light 99 is also energized during the period of operation of timing motor 98 to serve as an operational aid, while recording-time dial 105, usually calibrated in seconds, and indicating pointer 105A, are used to provide the operator with a visual indication of elapsed recording time in the total recording cycle. This facilitates recording of a message of the proper length as observation of the position of the pointer aids the operator in keeping the time required to read a message within the available recording time at the remote recorder-reproducer 147, Fig. 10, so that the recording cycle does not end before the complete message has been read.

Figures 12, 12A:
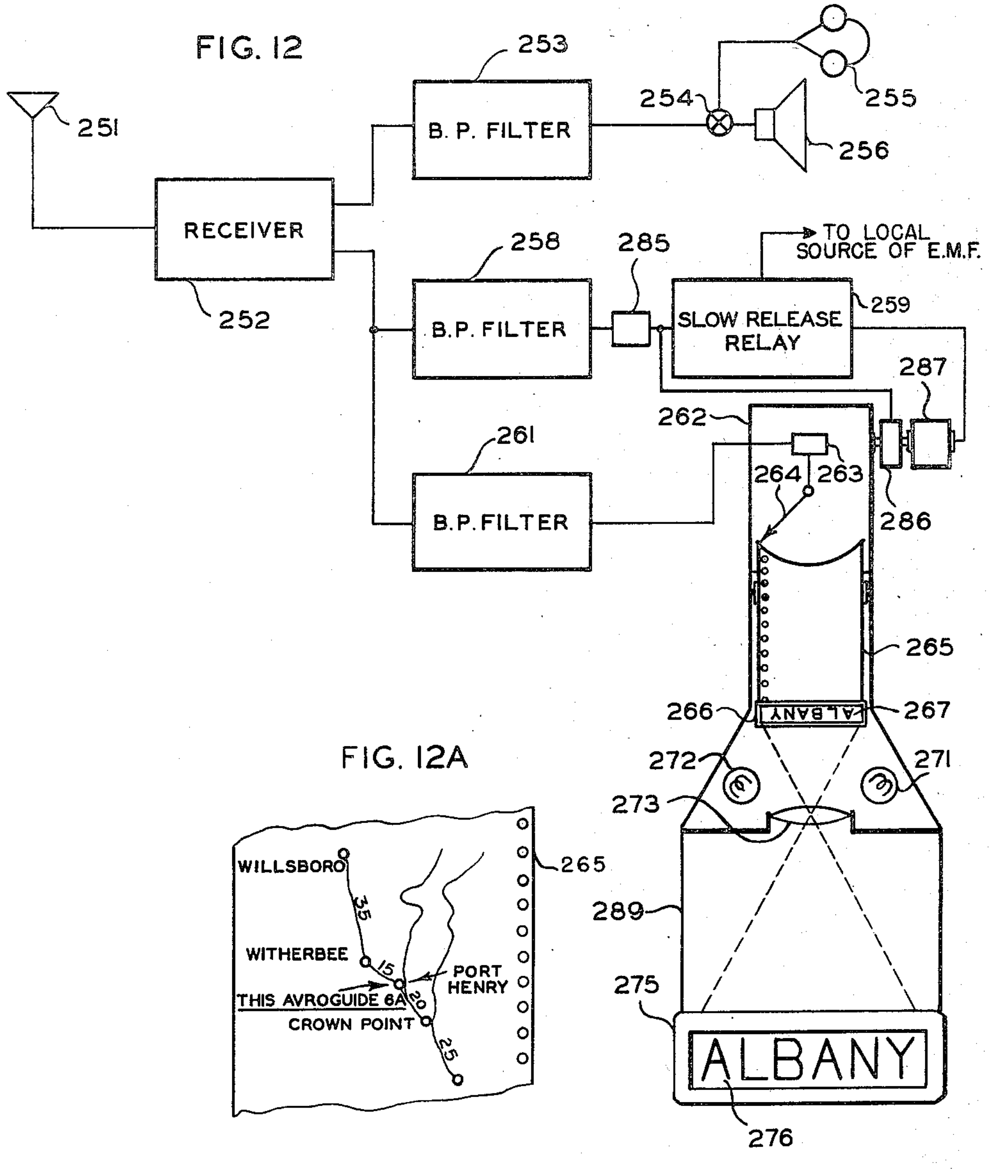
Fig. 12 is a block diagram showing one form of receiving equipment which may be utilized in an aircraft or other vehicle to provide reproduction of voice and tone signals as well as graphic record reproduction of maps, names of communities, or other subject matter, together with representative optical projection device for producing an enlarged image of the received matter.
Fig. 12A is a drawing representative of a map detail as received by the equipment indicated in Fig. 12.

Marking signals from facsimile scanner 26 may be applied to an input circuit 26D of amplifier 65 through band-pass filter 26A. In the representative arrangement as shown the facsimile signals may be applied to an input of amplifier 65 concurrently or independently with regard to speech signals from microphone 23. Band-pass filter 26B is connected between the synchronizing control circuit of scanner 26 and input 26C of amplifier 65 to pass only those frequencies used for synchronizing purposes. Band-pass filters 26A and 26B thus are employed between the output circuit of the facsimile scanner and the input circuit of amplifier 65 to reject any frequencies which might interfere with intelligible reception of voice signals from microphone 23. In this manner, voice signals in the frequency range from 300–3000 cycles may be applied to the input circuit of amplifier 65, while facsimile signals in the range from 3000–5000 cycles and 100–200 cycles or 5000–6000 cycles may also be applied to the input circuit of amplifier 65, the 3000–5000 cycle range being used for marking or printing purposes at receiving points equipped with facsimile recorders, and the 100–200 cycle or 5000–6000 cycle range being used for synchronizing, phasing and start-stop control of the motor utilized in the facsimile recorder, as is illustrated in Fig. 12.

Figure 9:
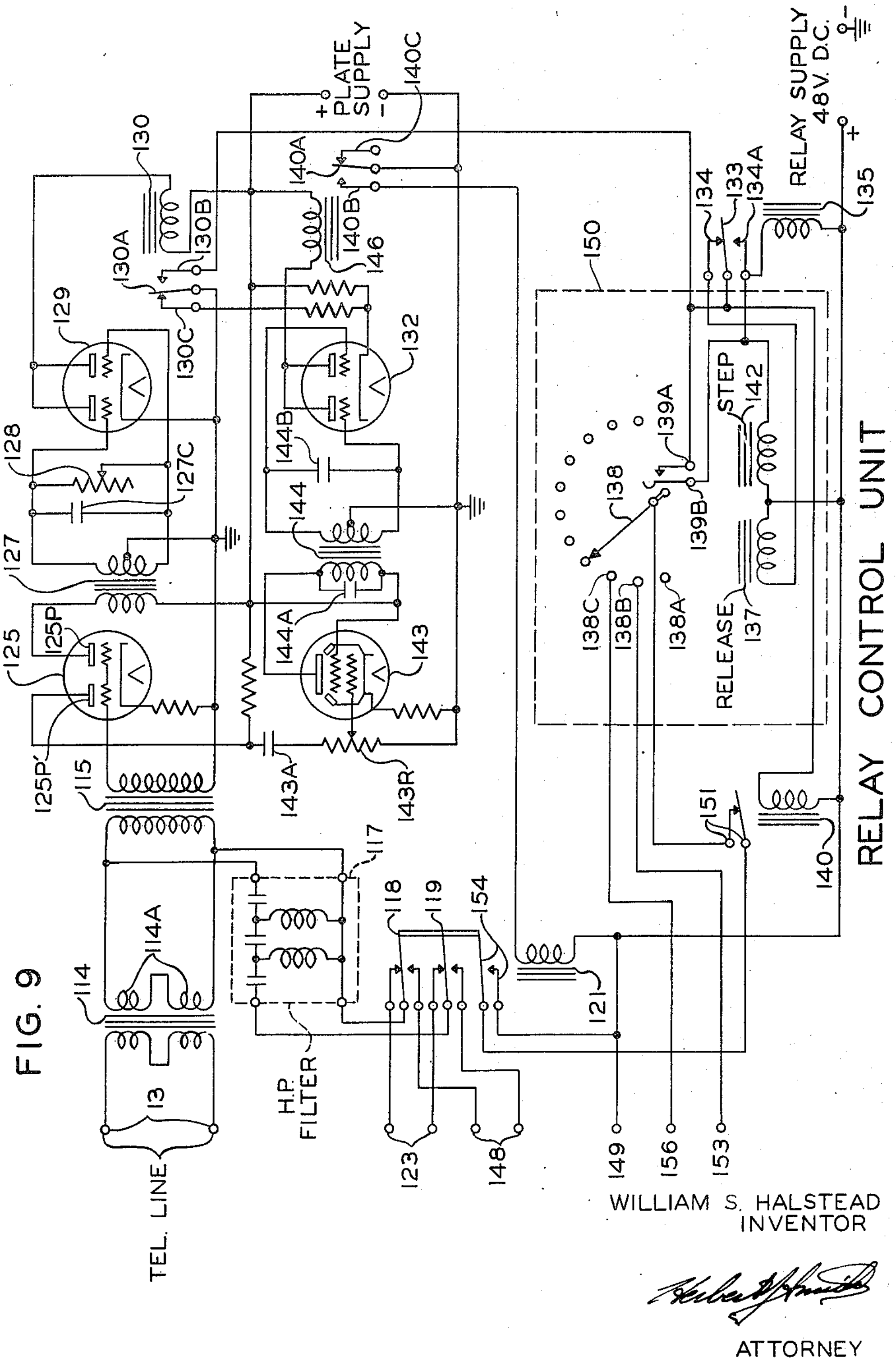
Fig. 9 is an illustrative schematic circuit diagram of a remotely-controlled selective switching unit employed at one of the remotely controlled transmitters.

The schematic diagram of Fig. 9 is illustrative of a relay control unit 14, Fig. 1, which may be installed at the transmitter and of line 13, Fig. 1, connecting with a telephone line such as 13, Fig. 8. The telephone line 13, Fig. 9, connects to line transformer 114 as shown. The winding 114A connects to transformer 115 and to the high-pass filter 117, which is connected between transformer winding 114A and the movable contacts 118 and 119 of relay 121. When relay 121 is in the non-energized position, as shown, the output circuit of filter 117, looking from transformer 114 into the filter, is connected to terminals 123, which connect with the output circuit of monitor receiver 21, Fig. 10, thereby applying received signals as picked up by monitor receiver 21 to transformer 114, the signals passing through filter 117. When the relay 121 is energized, as will be explained in subsequent paragraphs, the output circuit of filter 117, looking from transformer 114 into the filter, is connected through movable relay contacts 118 and 119 to terminal 148, connected with the speech input transformer 211, Fig. 10, of the radio transmitter and recorder-reproducer illustrated schematically in Fig. 10. The high-pass filter 117 serves to attenuate 60-cycle relay-control voltage impressed on line 13 by the remote control unit of Fig. 8, thereby preventing the 60-cycle control voltage from appearing in the input circuit of the radio transmitter or recorder unit of Fig. 10.

The secondary winding of transformer 115, Fig. 9, is connected to the grid circuit of dual triode amplifier tube 125. Plate 125P is connected to interstage transformer 127, having a secondary winding connected to one grid of dual triode tube 129. The plates of tube 129 are connected in parallel, and incorporate in their common plate circuit relay 130, which is utilized in dialing operations and is responsive to 60-cycle dialing pulses of relatively high voltage as supplied by the action of dial 69, Fig. 8. A variable control for adjusting the response point of relay 130 to the 60-cycle dialing voltage is effected by means of variable resistor 128, connected between one grid and ground of tube 129 as shown. In order to increase the response of tube 129 to 60-cycle control voltage and to present voice frequencies from energizing the relay 130B, a filter condenser 127C is placed across the secondary winding of transformer 127.

The contact arm 130A of relay 130 in normal position against the back contact 130C of relay 130 closes the cathode-to-ground circuit of tube 132, thereby rendering operative the amplifier of which tube 132 is the output stage. When the arm 130A is moved to "make" contact 130B by energization of relay 130 during the dialing operation, the cathode-to-ground connection of tube 132 is opened, thereby rendering tube 132 ineffective, and a ground connection is applied to contact arm 133 of a slow-release relay 135, to contact 139A of the selective switching unit 150 of which selector arm 138 is a part, and to the winding of a slow-release relay 140, thereby energizing relay 140. The back contact 134 of relay 135 is normally connected, as shown, to the winding of release coil 137, thereby causing energization of this coil during the dialing operation which releases rotary selector arm 138, allowing it to return to the "start" or "home" position 138A in well-known manner. Movement of selector arm 138 to the "start" position 138A closes contacts 139A and 138B, thereby energizing slow-release relay 135, causing movable contact 133 to move against front contact 134A, which maintains energization of "step" coil 142 and permits the selector arm 138 to advance to the selected step as determined by the number of received dialing pulses.

The contacts 151 of slow-release relay 140, which is energized during dialing, are connected in series with the selector, arm 138 and contacts 154, of relay 121 which serve to remove control voltage from arm 138 during dialing operations in which relay 140 and relay 135, both of slow-release type, remain closed.

In this manner, the 60-cycle dialing signal is amplified by tubes 125 and 127, energizes relay 130, and causes initial "homing" of selector arm 138, followed by advancement of the selector arm to any desired contact such as 138A, 138B or 138C in accordance with dialing pulses as transmitted by the dialing mechanism 69, Fig. 8, at the remote control point.

A second amplifier section, consisting of tubes 143 and 132, is connected in such manner that the control grid of tube 143 is coupled, through gain control 143R and coupling condenser 143A to plate 125P' of dual triode 125. The plate circuit of tube 143 is coupled through transformer 144 to the grid circuit of tube 132 in the plate circuit of which a slow response relay 146 is inserted. Condenser 144A is connected across the primary of transformer 144 to effect maximum response of tube 132 to 60-cycle control voltage and minimum response to voice frequencies. Condenser 144B is connected across the secondary of transformer 144 for the same reason. The movable contact arm 140A of relay 146 is connected to ground. When the relay is energized by sustained 60-cycle control voltage (Non-dialing Voltage) the contact 140A moves to contact 140 B, thereby applying energizing voltage to relay 121, which transfers the winding of line transformer 114 from connection with the monitor receiver 21, Fig. 10, to connection with the transmitter-recorder signal input transformer 211, Fig. 10. Closing of contacts 154 of relay 121 applies control voltage for operation of relays in the transmitter or recorder of Fig. 10, this voltage being applied through selector arm 138 and the selected contact such as 138B or 138C to terminals 156 and 153, as shown. Inasmuch as the control voltage impressed on the line to effect this transfer junction is of a low level as compared with the dialing control voltage, amplifier 143 and 132 are utilized in the connection as shown to effect positive operation of relay 146 except when it is presented from closing during the dialing operation by the lock-out action of relay 130. Also, as relay 130 is not closed by the low-voltage control signal which actuates relay 146, the selector arm 138 is not effected during periods when the low-voltage signal is applied to the line 112.

Figure 10:
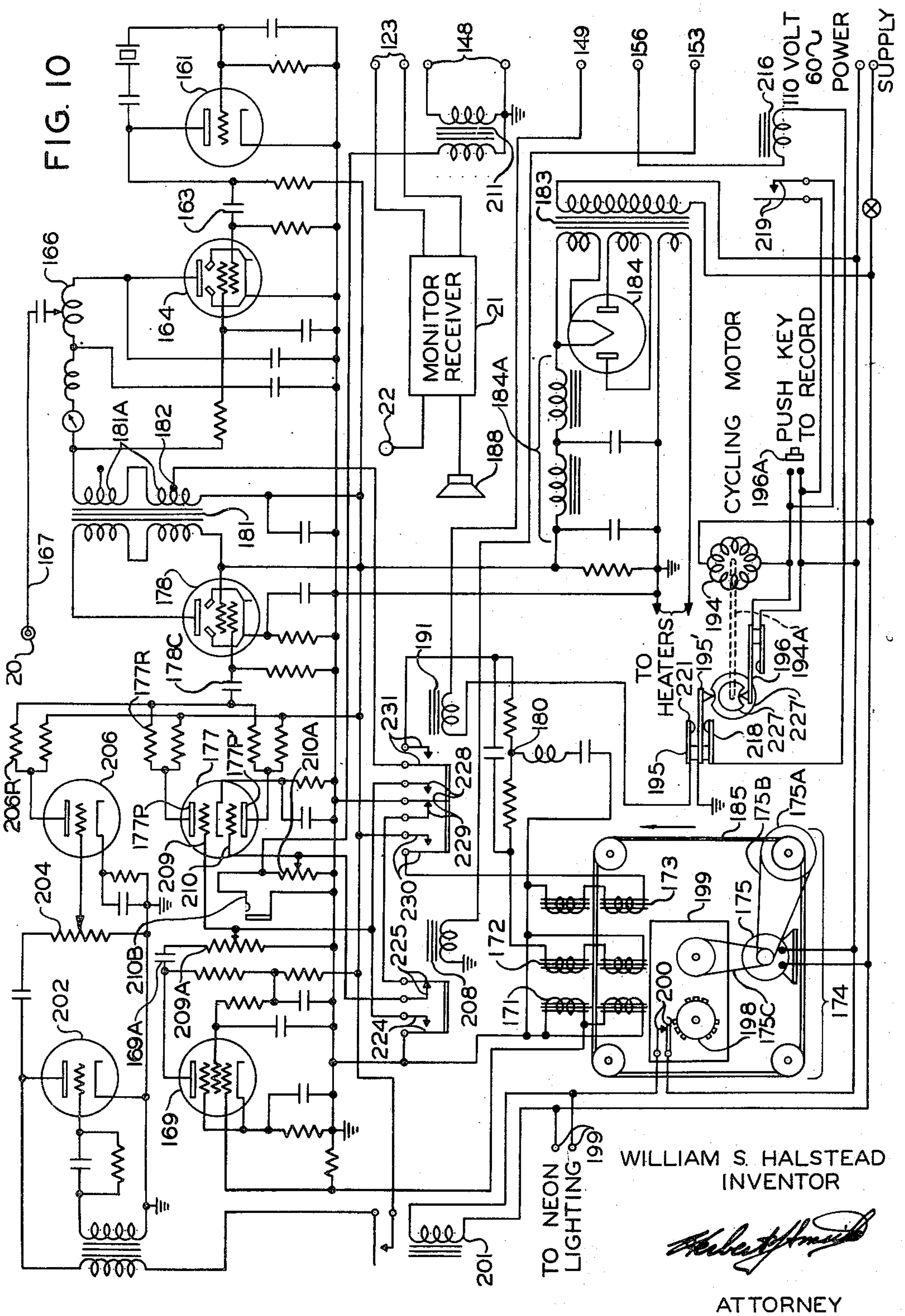
Fig. 10 is an illustrative schematic diagram of a transmitter showing controls and including a magnetic tape recorder-reproducer and monitor receiver.

Fig. 10 illustrates in schematic form an arrangement of radio transmitter, magnetic recorder-reproducer and monitor receiver together with control relays for permitting remote control of transmitting, recording and monitoring functions as will be explained. The radio transmitter includes a crystal-controlled oscillator tube 161, the output circuit of which is coupled through condenser 163 to the control grid of R. F. power amplifier tube 164, having a tank coil 166 and antenna lead 167, connected with antenna 20.

The audio section of the transmitter includes a high-gain amplifier tube 169 having its input circuit connected to a magnetic record pick-up coil 171 of magnetic recorder-reproducer device 174, in which an endless steel tape 185 bears magnetically-recorded signals and is moved past the pick-up coils 171 by means of rotation of roller 175A, which is driven by meter 175 and belt 175B. The plate circuit of tube 169 is coupled through condenser 169A and gain-control potentiometer 209A to the control grid 209 of a dual triode tube 177. Plate 177P of tube 177 is connected through decoupling resistor 177R and condenser 178C to the control grid of modulator tube 178, the plate of which is connected to the primary modulation transformer 181. The secondary winding 181A of transformer 181 is connected, as shown, to effect screen-grid modulation of R. F. power amplifier tube 164. Thus the transmitter is normally modulated by audio signals magnetically recorded on the steel tape 185, with the signals being transmitted continuously in recurrent manner as the tape 185 completes its cycle of rotation; i. e., its reproducing cycle. Plate and filament voltage for the vacuum tubes employed in the equipment as described is derived from the power supply transformer 183, the primary of which is connected to a suitable source of electric power such as 110-volts, 60 cycles. Full wave rectifier tube 184 is used to supply a direct-current plate potential, filter section 184A being used to filter the direct-current output of the rectifier 184 in conventional manner.

An audio-frequency signal generator tube 202 is used in a conventional oscillatory circuit as illustrated to provide a tone signal source for modulation of the transmitter. The tone signal is "keyed" in a predetermined code sequence by means of motor-driven code wheel 198, contacts 200, and relay 201, which applies plate voltage to the tone generator as determined by the operation of the code wheel. The motor 175 may be used to operate the code wheel 198 by means of belt 175C and reduction-gear box 199 of any well-known type to cause the tone signals to be applied to the input of the transmitter at predetermined time intervals. Modulation of the transmitter by the tone signal may be effected as follows. The output circuit of tone generator tube 202 is connected to gain control potentiometer 204 and the control grid of audio amplifier tube 206 in conventional manner. The plate of tube 206 is coupled to the control grid of modulator tube 178 through resistor 206R and condenser 178C. Thus, the transmitter may be concurrently modulated by pre-recorded speech signals from the recorder-reproducer device 174 and by coded tone signals from tone generator 202. Contacts 200, controlled by the code wheel 198, also apply energizing voltage to the neon tubes 42, Fig. 2, of the directional indicator, or spotlights 24A and 24B, Fig. 2, thereby providing synchronized flashing of the visual signaling means and radio transmission of a coded tone signal.

Monitor receiver 21 is connected as shown, with terminals 123 being connected to the audio output of the receiver. An R. F. signal pick-up means, such as antenna 22 is provided in the R. F. input circuit of the receiver, which a monitor loudspeaker or earphone unit 188 may be used for local checking or monitoring purposes.

The audio amplifier tube 177 is employed as a mixer to enable direct speech transmissions from the remote control unit 12, Fig. 1, to be impressed on the modulator input circuit of the transmitter. To effect this function, incoming speech signals from the remote control unit as they appear across terminals 148, Figs. 9 and 10, are passed through transformer 211 to the gain-control potentiometer 210A and thence to the control grid 210 of amplifier 177. In order to prevent continued modulation of the transmitter by the recurrent signals from the magnetic recorder-reproducer 174 during direct speech transmissions from the remote control point, control grid 209, associated with the recurrent speech channel, is rendered inoperative for the period of a direct speech transmission by the grounding of this grid during the period in which control grid 210 is placed in operative condition by removal of the ground connection. Such grounding of grid 209 and removal of ground from grid 210 is accomplished by means of relay 208. The relay is energized through application of control voltage to terminal 153, Figs. 9 and 10, and ground during direct speech transmissions when the control arm 138, Fig. 9, of selector switching unit 150 is positioned at control 138B by the action of the dialing mechanism 69, Fig. 8, and when contacts 154 of relay 121, Fig. 9, are closed thereby permitting 48 volts D. C. to be applied to relay 208, Fig. 10, when relay 208, Fig. 10, is energized as described, contacts 224 are closed, thereby grounding control grid 209, while contacts 225 are opened, thereby running a ground connection from control grid 210, this ground connection normally being applied through series connection of contacts 225 of relay 208 and contacts 229 of relay 191.

The plate 177P' of tube 177 is then coupled through condenser 178C to the control grid of modulator tube 178.

A jack 210B, connected across gain control potentiometer 210A, is provided for use with a local microphone, such as 19, Fig. 1.

In order to permit remote control of the recorder-reproducer 174 to enable a pre-recorded message to be magnetically erased and a new message recorded on steel tape 185 via circuit connections with a central control unit 12, Fig. 1, a record-reproduce transfer relay 191, Fig. 10, is employed in the circuit as follows: one side of the winding of relay 191 is connected to terminal 149, Figs. 9 and 10, to which the positive side of a source of E. M. F. is connected as shown in Fig. 9. The other side of the winding of relay 191 is connected to the upper contract 221 of cam-operated switch 195, having a movable arm 195', connected to ground, and a lower contact 218 connected to one side of the winding of relay 216, the other side of which is connected to terminal 156. The movable arm 195' of switch 195 normally drops into the indent of cam 227', allowing contacts 195' and 218 to close, while the contacts 221 and 195' normally remain open. Switch 196 is controlled by a second cam 227, this switch normally remaining open as shown in Fig. 10, with the movable arm resting in the indent of cam 227. The two contacts of switch 196 are connected in parallel with a momentary contact switch 196A, provided for local recording control purposes, and contacts 219 of relay 216. As shown in the circuit diagram, contacts 219 are in series with recording time-control motor 194 and the 110-volt 60 cycle power supply. Upon momentary closure of local recording control switch 196A or relay contacts 219, energizing voltage is applied to recording time-control motor 194, thereby initiating rotation of the motor-driven shaft 194A and cams 227' and 227. Upon movement of cam 227, switch 196 is closed, thereby shunting the momentary contact switch 196A and contacts 219, retaining the motor in operation until the cam 227 completes its cycle of rotation, at the end of which contacts 196 open, thus causing the motor to stop. It is pointed out that contacts 196 of relay 216, or switch 196A, are always open prior to termination of the rotational cycle of cam 227, in order to prevent continued operation of the motor after completion of an operating cycle of cam 227, which is equivalent in time to the recording cycle of recorder-reproducer 174. Concurrently with closure of cam I operated switch 196, the movable arm 195' of switch 195 is raised from contact 218 and meets contact 221, thus applying a ground connection to relay 191 and completing the electrical energizing circuit of this relay. Contacts 195' and 221 will remain closed for the duration of the rotational cycle of cam 227', maintaining energization of record-reproduce transfer relay 191 for this time period, or recording cycle. The contacts of relay 191 are connected to function as follows: Upon energization of relay 191, contacts 230 are closed, thereby applying signal obliterating voltage from the plate supply circuit to the obliterating coils 173, and causing a prior magnetic recording to be erased. Contacts 231 also close with energization of relay 191, applying audio signal energy from modulation transformer 181, through tap 182 and audio correction filter 180 to recording coils 172, thereby magnetically impressing speech signals from transformer 181 on tape 185. Contacts 228 are closed during energization of relay 191, effectively grounding control grid 209 of tube 177, thus rendering it ineffective as explained heretofore. Contacts 229 of relay 191 open with energization of the relay and remove the ground connection from control grid 210 of tube 177, rendering this control grid effective as long as relay 191 is energized.

Control relay 216 is normally employed in initiating operation of timing motor 194 and the subsequent recording operation. Relay 216 is energized by the selective control action of the selector switching unit 150, Fig. 9, arm 138 applying relay control voltage to contact 138C and terminal 156, Figs. 9 and 10. It should be noted that energizing voltage is applied to relay 21 from the positive side of a 48-volt D. C. relay power supply, as shown in Fig. 9, through contacts 154 of energized relay 121, and contacts 151 of relay 140, thence through selector arm 138 and contact 138C, terminal 156 and the winding of relay 216 to contact 218 cam-operated of switch 195 and grounded movable arm 195', completing the circuit. The indent of cam 227' is shaped in such manner that contacts 195' and 218 remain closed until after the motor has moved cam 227 sufficiently far to close switch 196, thereby keeping the motor in operation for the duration of the recording cycle after contacts 195' and 218 have opened and relay 216 has become de-energized.

When the foregoing is read in connection with the diagrams of Figures 8, 9, and 10, it may be seen that an operator at the remote control unit of Figure 8 effects direct speech transmission from the radio transmitter of Fig. 10 as follows: By dialing the first digit (1) on dial 68, the dialing relay 130, Fig. 9, is actuated. This causes the selector arm 138 to advance one step to contact 138B. Operation of the press-to-talk switch 80, Fig. 8, then closes relay 88, impressing a sustained 60-cycle control voltage on line 13 as well as speech signals from amplifier 65. The sustained 60-cycle control voltage, of relatively low potential, energizes relay 146, Fig. 9, and relay 121. Closure of contacts 154 on relay 121 applies 48 volts D. C., through normally-closed contacts 151, the selector arm 138, contact 138B and terminal 153 to relay 208, Fig. 10, thereupon effectively applying only voice signals from speech input transformer 211 to the control grid 210 of speech amplifier tube 117, causing direct speech modulation of the transmitter. When the operator at the remote control point wishes to make a new recording in the recorder-reproducer 174, Fig. 10, and simultaneously modulates the transmitter, he dials the second digit (2) on dial 69, Fig. 8. This actuates dialing relay 130, Fig. 9, and causes the selector arm 138 to move to contact 138C. The operator then presses the "push-to-record" switch 97, Fig. 8, which starts the local timing motor 98 and closes relay 88 for the length of the predetermined recording period, or recording cycle. Closure of relay 88, as previously explained, applies a sustained 60-cycle control voltage to line 13 as well as speech signal from amplifier 65. The sustained 60-cycle control voltage then actuates relay 146, Fig. 9, and relay 121. Closure of contacts 154 on relay 121 applies 48 volts D. C. to selector arm 138, contact 138C', terminal 156 and relay 216, Fig. 10. The contacts 219 of relay 216 when closed by energization of relay 216 apply voltage to timing motor 194, and thereby through its associated cam-operated switches 195 and 196 cause energization of relay 191 for the duration of the predetermined recording cycle. The contacts of relay 191, as explained in the foregoing specification, render grid 210 of tube 177 effective in impressing the speech signals from transformer 211 on the input of the transmitter, and place the recording-reproducing device 174 in the recording position. During the recording period the pre-recorded signals are prevented from modulating the transmitter by grounding of control grid 209 of tube 177.

After each recording operation the circuits return automatically to the monitoring position, thereby providing for the operator at the remote control point a check on the emitted radio signal.

While in the illustrated operational procedure the manner in which voice signals may be transmitted and recorded by the equipment of Figs. 8, 9, and 10 is explained, it is pointed out that graphic signals corresponding to visual subject matter may also be transmitted and received by facsimile, television, printer telegraph, telautograph, or other visual-intelligence transmitting and receiving system and that the signals from scanners or other graphic signal transmitting devices may be transmitted in lieu of voice signals, or concurrently with voice signals.

Figure 11:
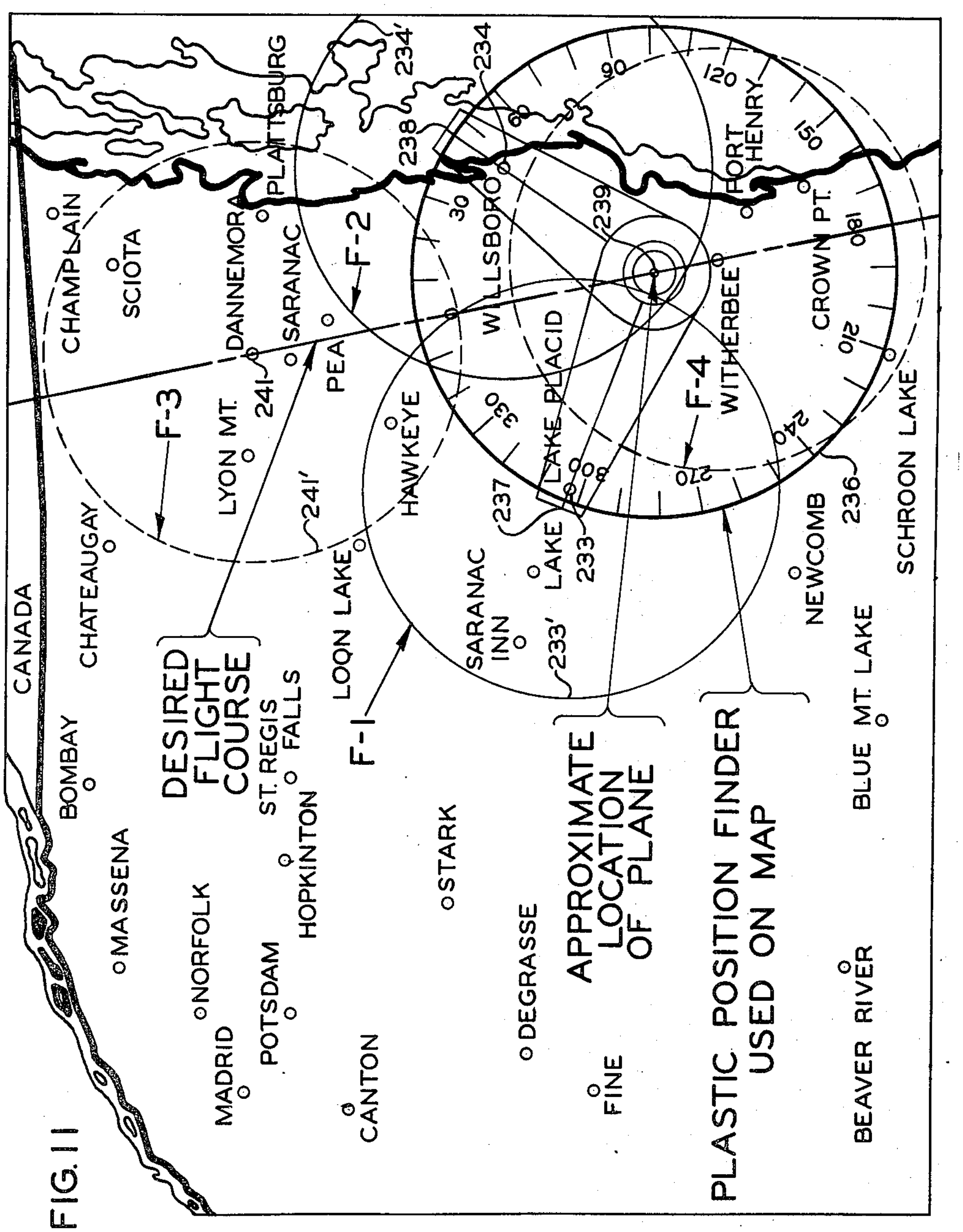
Fig. 11 is a map and illustrative triangulation device fabricated from transparent plastic material showing one application of the system for effecting determination of position of an aircraft by means of a simple triangulation technique.

Fig. 11 shows a typical sectional map, in which for the purpose of illustration, three localities or ground stations 233, 234, and 241 are shown equipped with low-power, short range radio-telephone transmitters, each having a relatively localized range within a zone covered by substantially circular radiation patterns represented as 233', 234', and 241'. It is assumed that the entire area also is equipped with similar stations.

In connection with the use of an antenna such as 20, Fig. 2, for operation at frequencies above 100 megacycles, for example, it is pointed out that an effective and substantially circular radiation pattern, as represented by 233', Fig. 11, may extend in a horizontal plane about the antenna for a distance of 15–20 miles from the radiator, this distance being measured in a horizontal plane extending normal to the projected center line, or axis, of the antenna 20, and at a given altitude, such as 5000 feet. The line 233', Fig. 11, may be considered, therefore, as a signal contour line at a given altitude, and may represent an approximate desired signal intensity, such as 100 microvolts per meter. The zone encompassed by line 233' may be considered as a primary service area with respect to transmitting station 233. The receivers, such as 252, Fig. 12, installed on aircraft, may be adjusted to provide full audio response at this designated signal strength, and at this signal level the associated graphic signal equipment, such as a facsimile recorder 262, Fig. 12, may be actuated automatically. In this manner, the receiver of an aircraft flying into zone 233', Fig. 11, for example, will cause the associated, normally-inoperative facsimile recorder 262, Fig. 12, to become operative automatically (in a manner explained in further detail in a following part of the specification) as the recurrently-transmitted signals from transmitting point 233, Fig. 12, are effectively picked up by the receiver. As the aircraft proceeds across the zone, or primary service area, encompassed within line 233', the received recurrent zone signals will cause continued printing of the recurrently-transmitted facsimile message in the facsimile recorder 262, while the automatically recurrent voice messages will also be reproduced within the aircraft. Upon exit of the aircraft from the zone, the radio signal intensity will drop to the point where the facsimile signals will no longer be of sufficient strength to operate the facsimile recorder in the aircraft, while the recurrent voice signals will drop out as the plane leaves the fringe of the effective radiation pattern, and the radio signal intensity falls below the threshold value required to operate the receiver. In this manner, effective localized signal zones of relatively definite delineation may be established in the vicinity of each transmitting point, as distinguished from the long-distance coverage obtained from non-localized radio-range transmitters which may be effective at distances of hundreds of miles.

Limitation in range of the zone transmitters may be accomplished by regulating the amount of power output of each transmitter in any well-known manner until a desired signal strength is obtained at a given point within the zone.

By the use of a directional beam antenna structure, such as 50—51, Fig. 5, a vertical radio beam may be established having a width, in horizontal cross-section, of 5–10 miles, at elevations of 5,000–10,000 feet. The shape of a horizontal cross-section of the vertically-directed beam may be elliptical or circular, depending upon the type of reflector and antenna employed. Thus, an aircraft flying at 5,000 feet and crossing the vertical beam at its widest point will automatically pick up the transmitted signals as the airplane enters the outer fringe of the beam where signal intensity becomes sufficient to actuate the receiver. The recurrent signals will then be received effectively as the aircraft proceeds in a horizontal direction across the beam. As the aircraft leaves the fringe of the beam, the signals will drop out, thus automatically terminating reception of the recurrent signals in the aircraft.

For navigational purposes, and assuming that overlapping radiation patterns are utilized, as shown in Fig. 11, the airplane pilot tunes in on the general band assigned for use with the system and picks up a station 233, on a frequency F1, repetitively transmitting a recorded message which identifies itself as Lake Placid (233). By rotating a directional loop attached to the airplane receiving system, the pilot finds that Lake Placid, 233, is on a bearing of 303 degrees to the direction in which he is headed.

The pilot then quickly tunes in another station on a frequency F2, which identifies itself as Willsboro, 234, which is on a bearing of 56 degrees to the direction in which he is headed.

The pilot is provided with a transparent plastic rosette 236, which is equipped with two locators 237 and 238 moving around a center point 239. The pilot places the rosette upon the map with the zero and 180 degrees points on the flight course, then by revolving the locator 237 to 303 degrees on the rosette, corresponding to the bearing on Lake Placid, 233, and by revolving the locator 238 to 56 degrees on the rosette, corresponding to the bearing on Willsboro 234, the rosette is moved so that the two above-mentioned towns are under the indicators. The center of the rosette 239 will then indicate the approximate location of the airplane and the pilot can determine if he is "on course" or correct his course to reach his desired destination 241.

In effecting automatic transmission of graphic signals within the localized zones associated with various airports and other control points along airway routes, the recorder-reproducer device 174, Fig. 10, may be employed to cause automatically repetitive transmission of graphic signal recordings such as recordings of facsimile television, telautograph, or radio printer signals on the record material 185 of the recorder-reproducer. In this technique, facsimile or other graphic signals constituting the signals derived from scanning of words such as "ALBANY AIRPORT," local maps portraying the terrain contiguous to airport areas, printed instructions giving local zone flying altitudes such as "PRIVATE FLY AT 2000–8000 FT," may automatically be visually displayed before the pilot or other occupants of an aircraft as the plane enters the localized signaling zone to which such visual information relates.

A representative receiving system for receiving voice and graphic signals is illustrated in Fig. 12, wherein a radio receiver 252, installed in an aircraft, for example, after demodulation of radio signals impressed on antenna 251 by action of an automatic transmitter such as 18, Fig. 1, applies demodulated signal energy within a designated voice frequency range (such as 300–2500 cycles) to loudspeaker 256 and/or earphones 255 through a band-pass filter 253. A junction box or selector switch 254 may be used between the output of the filter 253 and the earphones and/or loudspeaker to permit either or both transducers to be used. Received signal energy within a designated graphic signal frequency band, such as from 3000 cycles to 5000 cycles, employed for printing or marking purposes, is passed through bandpass filter 261 to the graphic signal receiving or recording device 262, which may be a facsimile recorder, teleprinter, cathode ray tube, or similar device for translating an electrical signal into visible matter.

In the illustrative diagram of Fig. 12 a facsimile recorder of the type described in U. S. Patents 2,364,357 and 2,347,477, is indicated, marking or printing signal energy as passed by filter 261 being applied to facsimile recording stylus 264 through recording control switch 263. Arrangement of switch 263 is such that recording voltage is applied to stylus 264 only during the time when the stylus 264 is sweeping across the electric-sensitive recording paper 265.

Synchronizing and motor control signals in a designated frequency band extending from 100 cycles to 200 cycles, or in a band from 6000 cycles to 7000 cycles, for example, are passed through band-pass filter 258 and are rectified by a full wave rectifier unit 285. Direct current energy from the rectifier 285 then actuates a slow-release relay 259, which causes operation of the driving motor 287 by applying energizing voltage from a local source of E. M. F. (not shown) to the motor 287. The signal rectifier 285 also supplies energizing voltage to the winding of electromagnetic clutch 286, thereby causing stylus 264 to move in proper synchronized relationship with respect to the timing of the marking signals, as is explained in U. S. Patents 2,364,357, and 2,347,477. The electromagnetic clutch 286 is actuated prior to each recording cycle, a synchronizing signal of designated frequency being passed by filter 258, rectified and applied to the winding of clutch 286 prior to the formation of each trace on the recording paper 265. The recurrent synchronizing signal also actuates the slow-release relay 259, the release time of the relay being sufficient to maintain closure of the contacts of the relay during intervals between the synchronizing signals. Thus, as long as the synchronizing signals are received, the motor 287 will operate. Cessation of the recurrent synchronizing signals for any appreciable period (five seconds, for example,) will cause the relay 259 to open, thereby removing power from motor 287, and terminating all operation of the recording machine. In this manner, as the aircraft enters a zone when the recurrent graphic signals are being transmitted, the relay 259 will automatically be energized by the received control signal, motor 287 will start, and the facsimile recorder will begin operation, thus printing information in record form such as the illustrative map detail on recording paper 265, Fig. 12A, for use by the pilot or other occupants of the plane. Then as the aircraft leaves the zone, the control signal will cease, relay 259 will open, and the motor 287 will stop, causing automatic termination of operation of the facsimile recorder.

In order to permit greater convenience in observation of recorded matter on paper 265, Fig. 12, by the pilot or other occupants of an aircraft, and to provide means to inform passengers of aircraft of the name of the control zone in which they are flying, recorded copy such as the word "ALBANY" 267, appearing in frame 266, may be enlarged by well-known optical means such as lens 273, lamps 272 and 271, and rear projection screen 276 arranged in frame 275. A light-tight box 289 is used to prevent entrance of sunlight or other unwanted light within the chamber where the optical projection occurs. By this means, all passengers of aircraft may see on a screen of substantial size the names of cities in their vicinity, news headlines or other information as received by recorder 262.

It is pointed out that the same automatic signaling technique and equipment may be used on vehicles other than aircraft, such as railway cars and locomotives, motor vehicles or boats as they enter or leave communications zones along traffic routes. It is to be emphasized, therefore, that the reference to aircraft in this specification is illustrative of one application of the system of the invention and is not in any sense a restriction of the usefulness of the invention to the field of air transportation.

In highway service, for example, the system may be used to serve as a combined radio and/or visual guide for operators of motor vehicles. In this instance, the directional indicator 24', Fig.

7, and sign 63, of electrically-operated type, may be erected in a vertical plane along the road in the manner of a wayside sign and may be used to indicate a particular route at intersections, while the distinctive identifying tone signal emitted by the zone transmitter 18, associated with the visual indicator 24′ and sign 63, will be transmitted in synchronism with the flashing of the visual indicator to serve as an aural aid in guiding the vehicle operator along a desired route. One route, for example, might employ a given tone signal of distinctive aural characteristic in synchronized association with a given visual indicator such as 24′, while a second route might employ a second distinctive tone signal in association with a second visual roadside indicator not illustrated.

In applying the system of the invention to highways or other ground traffic lanes, directional antennas such as 51, Fig. 5, may be used, with the reflector 52 being orientated 90 degrees so that radiobeam energy may be transmitted in a horizontal direction along the traffic route.

Other restricted-range, directional transmitting systems for localizing effective radio signaling along ground traffic routes, as are shown in my copending application, Serial No. 502,626 filed September 16, 1943, now Patent No. 2,405,501.

What is claimed as new and desired to be secured by Letters Patent of the United States is:

1. An aviation guide system, including, in combination with a main area divided into zones at least one of which has a landing field, a radio transmitter apparatus in each zone, each transmitter apparatus being capable of radiating signals having a different characteristic from the other zone transmitter apparatus as an identifying means, sound-record reproducing means influencing each transmitter apparatus, means for continuously operating the sound-record reproducing means so that instructive information is emitted in repetitive manner from the transmitter apparatus, a tone signal generator, means for modulating said transmitter by tone signals from said signal generator, and automatic visual indicating means at each transmitter apparatus and operated intermittently and concurrently with said tone signals emitted by the transmitter to visually and aurally identify the location of the transmitter apparatus with respect to the landing field in its respective zone.

2. An aviation guide system, including, in combination with a main area divided into zones at least one of which has a landing field, a radio transmitter apparatus in each zone, each transmitter apparatus being capable of radiating signals having a different characteristic from the other transmitter apparatus as an identifying means, sound record means influencing each transmitter apparatus, means for continuously operating the sound-record means so that instructive information is repetitively emitted from the transmitter apparatus, means at the transmitter apparatus for monitoring the emission from said transmitter of instructive information from said sound record means, and automatic visual indicating means at each transmitter apparatus discernible from aircraft in flight and operated intermittently and synchronously with signals emitted by said transmitter apparatus to visually signal the location of the landing field in its respective zone.

3. A method of guiding aircraft, which consists in emanating at selected geographical points automatic tone-modulated radio signals and visual identifying signals to be picked up by an aircraft, means for causing said tone-modulated radio signals and visual signals to be emitted synchronously, means for causing said tone-modulated radio signals to be repetitively transmitted on a radio wave length individual to each point, and means for causing such visual signals to be momentarily actuated only during the emission period of said tone-modulated radio signals.

4. An aviation guide system, including in combination, a plurality of radio zone transmitters together serving as an interlaced aircraft guidance network extending throughout a primary control area, each of said transmitters being effective in serving a localized signaling zone within said primary control area and having radiating means for causing radiation of carrier wave signals effective principally within the localized signaling zone established by said zone transmitter, each of said zone transmitters being capable of emitting signals of an individual characteristic as a station identifying means, a sound storage means including a sound-record bearing medium for influencing each of said zone transmitters to cause information comprising voice signals to be continuously transmitted, and a control means remote from said zone transmitters, whereby the voice signals as transmitted from said sound storage means may be deleted and replaced by substitute information from said remote point.

5. An aviation guide system, including in combination, a plurality of radio transmitters together serving as an interlaced communications network extending throughout a primary control area, each of said transmitters being effective in serving a localized signaling zone within said primary control area and being capable of radiating signals of an individual characteristic as a station identifying means and including a source of voice signal energy comprising a sound storage device of magnetic recorder-reproducer type, a second signal source comprising a tone signal generator, means for causing voice signal energy from said sound storage device to modulate said zone transmitter, means for causing a tone signal from said generator to modulate said zone transmitter at periodic intervals, signal radiating means associated with said zone transmitter for radiating wave energy impressed upon it by said transmitter, a visual indicating means disposed in proximity to said zone transmitter, said visual indicating means being observable from an airplane and arranged in such manner and shape as to serve as an illuminated directional index pointing toward a predetermined point, and switching means actuated during the period in which said tone signal is transmitted to cause illumination of said visual indicating means during the period in which the tone signal is modulating said zone transmitter.

6. An aviation guide system, including in combination, a plurality of zone radio transmitters together serving as an interlaced communications network extending throughout a primary control area, each zone radio transmitter serving a given zone of said primary control area, each zone transmitter being capable of radiating signals of an individual characteristic as an identifying means, each zone transmitter including a source of voice signal energy comprising a sound storage device of the magnetic recorder-reproducer type, a second signal source comprising a tone signal generator, means for causing a tone signal from said generator to modulate said zone transmitter at periodic intervals, means for causing voice signal energy from said sound storage device to modulate said zone transmitter, radiating means associated with said zone transmitter for radiating wave energy impressed upon it by said zone transmitter, a visual indicating means disposed in proximity to said zone transmitter, said visual indicating means being observable from an airplane and arranged in such a manner and shape as to serve as an illuminated directional index, switching means actuated during the period in which said tone signal is transmitted to cause momentary illumination of said visual index during the period in which the tone signal is modulating said zone transmitter, and a remote control means circuitously connected with the zone transmitter and said sound storage device for monitoring and changing from a central control point the voice signals, modulating said zone transmitter.

7. In a system for automatically communicating intelligence to aircraft in flight, a radio transmitter, a signal radiating means connected to the output of said radio transmitter, a recorder-reproducer device having the output thereof connected to the input of said transmitter, a visual indicating means disposed to be observable from an aircraft in flight in the vicinity of said visual indicating means, a tone generator for modulating said transmitter, keying means for operating the visual indicator and the tone generator substantially simultaneously, and means for simultaneously transmitting voice intelligence from said radio transmitter and impressing said voice intelligence upon the recorder-reproducer device during the recording cycle thereof, said recorder-reproducer embracing means for automatically reproducing the signal intelligence impressed upon the recorder to the end that at the completion of the recording cycle the signal intelligence impressed upon said recorder will be automatically reproduced to modulate said transmitter.

8. In a system for automatically communicating intelligence to aircraft in flight, a radio transmitter, a signal radiating means connected to the output of said radio transmitter, a recorder-reproducer device having the output thereof connected to the input of said transmitter, a visual indicating means disposed to be observable from an aircraft in flight in the vicinity of said visual indicating means, a tone generator, keying means for operating the visual indicating means and modulating said transmitter by a tone signal from said tone generator substantially simultaneously, means for simultaneously transmitting voice intelligence from said radio transmitter and impressing said voice intelligence upon said recorder-reproducer during a recording cycle thereof, said recorder-reproducer embracing means effective at the completion of the recording cycle for automatically causing the voice intelligence impressed upon the recorder to effect substantially continuous modulation of said transmitter, whereby said tone signal and said recorded voice intelligence may simultaneously modulate said transmitter.

9. In a system for automatically communicating intelligence to aircraft in flight, a radio transmitter, a signal radiating means connected to the output of said radio transmitter, a recorder-reproducer device having the output thereof connected to the signal input of said transmitter, a visual indicating means disposed to be observable from an aircraft in flight in the vicinity of said visual indicating means, a tone generator for modulatng said transmitter, keying means for operating the visual indicator and impressing on the signal input of said transmitter a tone signal from said tone generator substantially simultaneously, and means for impressing signal intelligence upon the recorder-reproducer, said recorder-reproducer embracing means for automatically reproducing the signal intelligence impressed upon the recorder to the end that at the completion of the recording cycle the signal intelligence impressed upon said recorder will be automatically reproduced to modulate said transmitter.

10. In a system for automatically communicating intelligence to aircraft in flight, a radio transmitter, a signal radiating means connected to the output of said radio transmitter, a recorder-reproducer device having the output thereof connected to the signal input of said transmitter, a visual indicating means disposed to be observable from an airborne aircraft in the vicinity of said visual indicating means, a tone generator, keying means for operating the visual indicator and impressing a tone signal from said tone generator on the signal of said transmitter substantially simultaneously, and means for simultaneously transmitting voice intelligence by said radio transmitter and impressing said voice intelligence upon the recorder-reproducer during the recording cycle, said recorder-reproducer embracing means for automatically reproducing the voice intelligence impressed upon the recorder, a monitor radio receiver disposed adjacent the signal radiating means for receiving the signal from said radio transmitter, and remote control means for selectively changing the voice intelligence transmitted by said radio transmitter and monitoring the radio transmitter to establish a check on proper emission of said voice intelligence by said transmitter.

11. In a system for automatically communicating intelligence to aircraft in flight, a plurality of radio transmitters, each transmitter having a signal radiating means connected to an output circuit thereof, a recorder-reproducer device having the output thereof connected to the signal input of said transmitter, a visual indicating means disposed to be observable from an aircraft in flight in the vicinity of said visual indicating means, a tone generator, keying means for operating the visual indicator and impressing a tone signal from said generator on the signal input of said transmitter substantially simultaneously, and means for simultaneously transmitting voice intelligence from said transmitter and impressing said voice intelligence upon the recorder-reproducer during the recording cycle thereof, said recorder - reproducer embracing means for automatically reproducing the voice intelligence impressed upon the recorder, a plurality of monitor radio receivers, each receiver disposed in operative relation to the signal radiating means associated with each of said transmitters for monitoring the signal from said radio transmitter, remote control means for changing the voice intelligence emitted by said radio transmitters and for monitoring the emission of said transmitters by connection with said receiver, and switching means for selectively connecting any of said transmitters or receivers to the remote control means.

12. In an automatic aircraft guidance system, a radio transmitter disposed adjacent an airport, an antenna connected to the output circuit of said radio transmitter, said antenna being arranged and positioned so that an upwardly directed radiation pattern therefrom is established in a localized communications zone contiguous to said transmitter and said airport, a tone generator, a visual signal device so directed that light rays from said visual signal device are propagated upwards within said zone contiguous to said radio transmitter, automatic switching means for periodically applying tone signals from said tone generator to a signal input of said radio transmitter and synchronously energizing said visual signal device to the end that both upwardly directed radio radiation pattern and light rays provide a synchronized audio-visual guiding and localizing signal for locating and identifying said radio transmitter and associated airport from an aircraft in flight within the localized communications zone encompassed by said radiation pattern.

13. In an automatic aircraft guidance system, a radio transmitter, a directional antenna connected to the output of said transmitter, said antenna producing an upwardly directing radiation pattern having a cross-sectional area extending over the localized communications zone contiguous to said transmitter, a repeating sound recording-reproducing device having a magnetic sound record carrier and normally operative to cause repetitive reproduction and transmission of prerecorded voice signals including reports on current flying conditions and landing instructions relating to an airport in the vicinity of said transmitter, remote control means circuitously connected with said transmitter, and switching means at said transmitter responsive to said remote control means, whereby monitoring signals derived from said transmitter are normally reproduced by said remote control means when in standby condition, and whereby voice signals conveying new information of value to occupants of aircraft in said localized communications zone may be recorded on said magnetic sound record carrier concurrently with obliteration of said first-mentioned voice signals without substantially interrupting the continuity of transmission of information by said radio transmitter.

14. An aircraft guidance device including a radio transmitter, a directional antenna for producing an upwardly-directed radio wave radiation pattern, an upwardly directed visual signaling device for producing light rays extending skyward and substantially contiguous to said radio wave radiation pattern, a tone generator, automatic switching means whereby a tone signal from said tone generator is periodically impressed on an input circuit of said transmitter and whereby said visual signaling device is energized synchronously with said tone signal transmission, to the end that the audio-visual signal thereby produced is normally discernible on an aircraft in flight within the space effectively encompassed by said radiation pattern and will serve as a means of identifying and locating said transmitter.

15. An aircraft guidance device including a radio transmitter, an antenna connected to the output circuit of said transmitter and effective in emitting radio wave energy within a signaling zone extending contiguous to said transmitter, a visual signaling means including an arrow-like directional indicator orientated in the direction of an adjoining airport, a tone generator, automatic switching means for causing periodic modulation of said transmitter by a tone signal from said tone generator and synchronous illumination of said directional indicator, a sound-record reproducing and recording means, including a magnetic sound-record strip, switching means for normally connecting said sound record reproducing and recording means to the input of said transmitter whereby voice signals as prerecorded on said magnetic sound record strip are substantially repetitively emitted by said transmitter for guidance of aircraft within said signaling zone, a remote control device including a microphone, a sound transducer, and a switching means, said remote control device being electrically connectable to said transmitter, said second-mentioned switching means being controlled by said last-mentioned switching means to cause obliteration of voice signals previously recorded on said magnetic sound record strip and concurrent replacement of the prerecorded signals by new voice signals as picked up by said microphone during a recording cycle without causing substantial interruption in the continued transmission of information by said transmitter, said last-mentioned switching means being automatically operative at the end of a recording cycle to cause reproduction of signals in said sound transducer for monitoring purposes.

WILLIAM S. HALSTEAD.

REFERENCES CITED

The following references are of record in the file of this patent:

UNITED STATES PATENTS

| Number | Name | Date |
|---|---|---|
| 1,885,023 | Dieckmann | Oct. 25, 1932 |
| 2,077,196 | Alexanderson et al. | Apr. 13, 1937 |
| 2,165,256 | Hansell | July 11, 1939 |
| 2,173,863 | Sharma | Sept. 26, 1939 |
| 2,298,476 | Goldsmith | Oct. 13, 1942 |
| 2,300,581 | Luck | Nov. 3, 1942 |
| 2,421,017 | Deloraine et al. | May 27, 1947 |

FOREIGN PATENTS

| Number | Country | Date |
|---|---|---|
| 467,013 | Great Britain | June 9, 1937 |